United States Patent [19]

Washiyama et al.

[11] Patent Number: 4,990,386
[45] Date of Patent: Feb. 5, 1991

[54] OPTICAL DISK SUBSTRATE

[75] Inventors: Junichiro Washiyama; Motoyuki Hirata; Tetsuo Yasuda; Shigenobu Ishihara, all of Kanagawa, Japan

[73] Assignee: Showa Denko Kabushiki Kaishi, Tokyo, Japan

[21] Appl. No.: 334,492

[22] Filed: Apr. 7, 1989

[51] Int. Cl.$^5$ .............................................. B32B 3/00
[52] U.S. Cl. ........................................ 428/64; 428/65; 428/412; 428/913; 369/288; 346/76 L; 346/135.1; 430/945
[58] Field of Search ................ 428/64, 65, 412, 913; 369/288; 346/76 L, 135.1; 430/945

[56] References Cited

FOREIGN PATENT DOCUMENTS 0283975  3/1988  European Pat. Off. .

OTHER PUBLICATIONS

Jap. Abs. No. 89-231071/32, Showa Denko K.K., 6-2-9-89.
Jap. Abs. No. 86-160408/25, Toray Ind. Ins., 5-13-86.
CA, 109(20):171623d, Daicel/Chem. Ind. Ltd., 4-2-1-88.
*Chemical Abstracts*, vol. 111, No. 8, Aug. 21, 1989, p. 14, col. 1, Abstract No. 58547k.
*Chemical Abstracts*, vol. 111, No. 18, Oct. 30, 1989, p. 15, col. 1, Abstract No. 154589w.
*World Patent Index*, 1989, Abstract No. 231071/32 & *Patent Abstracts of Japan*, vol. 13, No. 436, Sep. 29, 1989.
*Chemical Abstracts*, vol. 107, No. 10, Sep. 7, 1987, p. 57, col. 2, Abstract No. 79076p.
*Chemical Abstracts*, vol. 108, No. 8, Feb. 22, 1988, p. 39, col. 1, Abstract No. 57183q.
*Chemical Abstracts*, vol. 107, No. 25, Dec. 21, 1987, p. 68, col. 2, Abstract No. 238259u.
*Chemical Abstracts*, vol. 106, No. 3, Jan. 19, 1987, p. 41, col. 1, Abstract No. 19624k.
*Chemical Abstracts*, vol. 105, No. 22, Dec. 1, 1986, p. 62, col. 1, Abstract No. 192445e.
*Chemical Abstracts*, vol. 100, No. 26, Jun. 25, 1984, p. 61, col. 2, Abstract No. 211313a.

Primary Examiner—Patrick J. Ryan
Attorney, Agent, or Firm—Sughrue, Mion, Zinn, Macpeak & Seas

[57] ABSTRACT

An optical disk substrate is disclosed, which is molded from a terpolymer composed of (A) an aromatic vinyl monomer, (B) cyclohexylmaleimide, and (C) at least one compound selected from the group consisting of (meth)acrylonitrile, isobornyl (meth)acrylate and cyclohexyl (meth)acrylate, with the cyclohexyl maleimide being copolymerized in an amount of from 5 to 60 wt % of said terpolymer. The optical disk substrate exhibits high heat resistance, low water absorption and low birefringence.

10 Claims, No Drawings

OPTICAL DISK SUBSTRATE

FIELD OF THE INVENTION

The present invention relates to an optical disk substrate which exhibits high heat resistance, low water absorption and low birefringence.

BACKGROUND OF THE INVENTION

Optical disks have been used not only in the video and audio fields but also in the field of computer as document files, external memories and the like. Since semiconductor laser is used for recording and reproducing information on the optical disks, substrates for the optical disks are required to have high heat resistance, high transparency, low water absorption and low birefringence. The optical disk substrates are also required to be produced at high productivity. In order to meet these requirements, various substrate materials are used depending on use of the optical disks: polycarbonate resins (hereinafter abbreviated as PC) are used in compact disks (CD); polymethyl methacrylate resins (PMMA) are used in video disks (LVD); and glass, PC or PMMA is used in optical disks serving as document files.

Erasable-DRAW (direct read after write) optical disks such as external memories for computers which are capable of information recording, erasure and reproduction require substrates exhibiting more heat-resistant, less moisture absorption and less birefringence than the conventional substrates for CD, LVD and document files. In an attempt to satisfy this need, various PCs and low-moisture-absorption PMMAs have been proposed, as described, for example, in JP-A-58-179224, JP-A-60-166322, JP-A-60-130611, JP-A-60-147416 and JP-A-61-36307. (The term "JP-A" used herein means an unexamined published Japanese patent application.) However, PCs are low in molding efficiency and disk substrates produced therefrom experience an increased degree of birefringence. Substrates made of PMMAs are satisfactory with respect to birefringence but they do not exhibit good moisture absorption and good heat resistance at the same time. The use of reinforced glass has also been proposed, but in order to form pre-grooves, the so-called "2P" process must be employed and this results in a very low productivity. In addition, the pre-grooved glass substrate is liable to crack. Thus, the substrate materials previously proposed are not completely satisfactory in terms of various physical properties and productivity.

SUMMARY OF THE INVENTION

An object of the present invention is to provide an optical disk substrate that is free from the aforementioned problems of the prior art, namely, an optical disk substrate that has high heat resistance and low water absorption, that has high optical uniformity and that can be produced efficiently by injection molding.

This object of the present invention can be attained by an optical disk substrate that is molded from a terpolymer of (A) an aromatic vinyl monomer, (B) cyclohexylmaleimide, and (C) at least one compound selected from the group consisting of (meth)acrylonitrile, isobornyl (meth)acrylate and cyclohexyl (meth)acrylate, with the cyclohexylmaleimide being copolymerized in an amount of from 5 to 60 wt% of said terpolymer.

DETAILED DESCRIPTION OF THE INVENTION

The terms "(meth)acrylo-" or "(meth)acrylate" for the comonomer (C) used herein means acrylo- or methacrylo-, and acrylate or methacrylate, respectively.

The aromatic vinyl monomer (A) which is used as one comonomer for the terpolymer of the present invention is represented by formula (I)

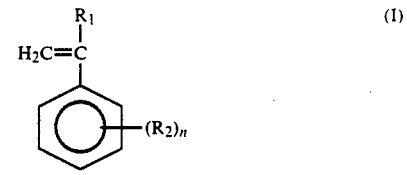

wherein $R_1$ represents a hydrogen atom and a hydrocarbon group having one or two carbon atoms, $R_2$ represents a straight-chain, branched-chain or cyclic hydrocarbon group having not more than 8 carbon atoms, and n is 0 or an integer of 1 to 5. Typical examples of the aromatic vinyl monomer (A) include styrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, 2,5-diethylstyrene, 3,5-diethylstyrene, 2,4,5-triethylstyrene, 2,3,4,5-tetraethylstyrene, pentaethylstyrene, o-isopropylstyrene, m-isopropylstyrene, p-isopropylstyrene, p-n-butylstyrene, m-sec-butylstyrene, p-sec-butylstyrene, m-ter-butylstyrene, p-tert-butylstyrene, p-hexylstyrene, p-heptylstyrene, p-octylstyrene, p-nonylstyrene, p-decylstyrene, p-dodecylstyrene, p-tetradecylstyrene, p-hexadecylstyrene, p-octadecylstyrene, p-sec-amylstyrene, p-sec-hexylstyrene, p-sec-heptylstyrene, p-sec-octylstyrene, p-sec-nonylstyrene, p-sec-decylstyrene, 2,4,5-triisopropylstyrene, 2,6-dimethyl-4-tert-butylstyrene, and p-cyclohexylstyrene. Of these, styrene and α-methylstyrene are preferred, and styrene is particularly preferred. The aromatic vinyl monomer (A) may be used alone or as a mixture thereof.

In a preferred embodiment (the first embodiment) of the present invention, the terpolymer is composed of an aromatic vinyl monomer, cyclohexylmaleimide and (meth)acrylonitrile, with the cyclohexylmaleimide being copolymerized in an amount of from 5 to 40 wt%, preferably from 5 to 35 wt%, more preferably from 5 to 30 wt%, of the terpolymer. If the cyclohexylmaleimide is copolymerized in an amount of less than 5 wt%, desired heat resistance is not attained. If it is more than 40 wt%, the resulting terpolymer is brittle.

In the terpolymer according to the first embodiment of the present invention, (meth)acrylonitrile is copolymerized in an amount of from 5 to 25 wt%, preferably from 5 to 20 wt%, more preferably from 7 to 20 wt%, of the terpolymer. If less than 5 wt% of the (meth)acrylonitrile is copolymerized, not only is the resulting terpolymer brittle but also the resulting disk substrate experiences increased birefringence. If it is more than 25 wt% of the (meth)acrylonitrile is copolymerized, only a low-quality disk which has low transparency and warps upon moisture absorption is obtained.

Further, the aromatic vinyl monomer is present in an amount of at least 40 wt% but preferably not more than 80 wt% of the terpolymer, with the range of from 40 to 70 wt% being particularly preferred. If less than 40 wt% of the aromatic vinyl monomer is copolymerized in the first embodiment, the resulting terpolymer experiences increased moisture absorption. If it is more than 80 wt%, a disk substrate having desired heat resistance is not obtained.

In another preferred embodiment (the second embodiment) of the present invention, the terpolymer is composed of an aromatic vinyl monomer, cyclohexylmaleimide and isobornyl (meth)acrylate, with the cyclohexylmaleimide being copolymerized in an amount of from 5 to 60 wt%, preferably from 5 to 50 wt%, more preferably from 5 to 45 wt%, of the terpolymer. If the cyclohexylmaleimide is copolymerized in an amount of less than 5 wt%, desired heat resistance is not attained. If more than 60 wt% of the cyclohexylmaleimide is copolymerized, the resulting terpolymer is brittle.

The isobornyl (meth)acrylate used in this embodiment is represented by formula (II)

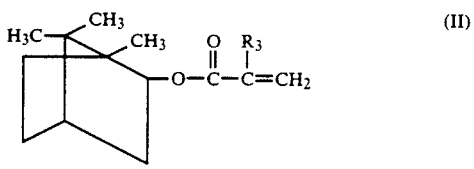

wherein $R_3$ represents a hydrogen atom or a methyl group.

In the terpolymer according to the second embodiment of the present invention, isobornyl (meth)acrylate is copolymerized in an amount of from 10 to 80 wt%, preferably from 10 to 70 wt%, more preferably from 10 to 60 wt%, of the terpolymer. If less than 10 wt% of the isobornyl methacrylate is copolymerized, desired heat resistance is not attained. If more than 80 wt% of the isobornyl methacrylate is copolymerized, the resulting terpolymer tends to have various compositions, so that its transparency becomes poor.

Further, the aromatic vinyl monomer which constitutes the remaining part of the terpolymer is present in an amount of from 10 to 80 wt%, preferably from 10 to 70 wt%, more preferably from 10 to 60 wt%, of the terpolymer. If less than 10 wt% of the aromatic vinyl monomer is copolymerized in the second embodiment, not only is the resulting terpolymer brittle but also a disk substrate produced from it experiences increased birefringence. If it is more than 80 wt%, desired heat resistance is not attained.

In a still another preferred embodiment (the third embodiment) of the present invention, the terpolymer is composed of an aromatic vinyl monomer, cyclohexylmaleimide and cyclohexyl (meth)acrylate, with the cyclohexylmaleimide being copolymerized in an amount of from 10 to 60 wt%, preferably from 10 to 55 wt%, more preferably from 20 to 55 wt%, of the terpolymer. If the cyclohexylmaleimide is copolymerized in an amount of less than 10 wt%, desired heat resistance is not attained. If more than 60 wt% of the cyclohexylmaleimide is copolymerized, the resulting terpolymer is brittle.

In the terpolymer according to the third embodiment of the present invention, cyclohexyl (meth)acrylate is copolymerized in an amount of from 5 to 45 wt%, preferably from 10 to 40 wt%, more preferably from 15 to 35 wt%, of the terpolymer. If less than 5 wt% of the cyclohexyl methacrylate is copolymerized, not only is the resulting terpolymer brittle but also the disk substrate produced from it experiences increased birefringence. If it is more than 45 wt%, the resulting disk substrate has only low heat resistance.

Further, the aromatic vinyl monomer which constitutes the remaining part of the terpolymer is present in an amount of at least 30 wt% but preferably not more than 80 wt% of the terpolymer, with the range of from 30 to 70 wt% being particularly preferred. If less than 30 wt% of the aromatic vinyl monomer is copolymerized in the third embodiment, the resulting terpolymer experiences increased moisture absorption. If more than 80 wt% of the aromatic vinyl monomer is copolymerized, not only is the birefringence increased but also the heat resistance is impaired.

The above-described terpolymer which is composed of (A) an aromatic vinyl monomer, (B) cyclohexylmaleimide, and (C) at least one compound selected from among (meth)acrylonitrile, isobornyl (meth)acrylate and cyclohexyl (meth)acrylate may be molded into an optical disk substrate by various methods as be described below, either directly or after being mixed with a suitable additive such as antioxidant, UV absorber, antistatic agent, lubricant and release agent, which are commonly employed in molding of styrene resins. These additives should be used in amounts that will not impair the inherent physical properties (e.g., heat resistance and transparency) of the terpolymer, and the total amounts of the additives are preferably not more than 5 parts by weight per 100 parts by weight of the terpolymer.

Typical examples of antioxidants used in the present invention include phenolic compounds such as 2,6-di-tert-butyl-4-methylphenol, styrenated phenol, n-octadecyl-3-(3',5'-di-tert-butyl-4'-hydroxyphenyl)propionate, 2,2'-methylene-bis-(4-methyl-6-tert-butylphenol), 2-tert-butyl-6-(3'-tert-butyl-5'-methyl-2'-hydroxybenzyl)-4-methylphenyl acrylate, 4,4'-butylidene-bis-(3-methyl-6-tert-butylphenol), 4,4'-thio-bis-(3-methyl-6-tert-butylphenol), 3,9-bis-2-[3-(3-tert-butyl-4-hydroxy-5-methylphenyl)propionyloxy]-1,1-dimethylethyl-ethyl]-2,4,8,10-tetraoxaspiro[5,5]undecane, tetrakis[methylene-3-(3', 5'-di-tert-butyl-4'-hydroxyphenyl)propionate]methane and 1,3,5-tris-(4-tert-butyl-3-hydroxy-2,6-dimethylbenzyl)isocyanulate; amine compounds such as alkylated diphenylamines and mixed N,N'-diaryl-p-phenylenediamines; organic sulfur compounds such as dimyristyl-3,3'-thiodipropionate, dilauryl-3,3'-thiodipropionate, pentaerythritol-tetrakis($\beta$-laurylthiopropionate), distearyl-3,3'-thiodipropionate, 2-mercaptobenzimidazole, ditridecyl-3,3'-thiodipropionate; and phosphur compounds such as triphenyl phosphite, tris-(2,4-di-tert-butylphenyl)phosphite and trisnonylphenyl phosphite. These antioxidants may be used alone or as a mixture thereof. The antioxidant may be added in an amount of not more than 5 parts by weight per 100 parts by weight of the terpolymer. When it is more than 5 parts by weight, the heat resistance and transparency of the resulting terpolymer tend to be deteriorated.

Examples of UV absorbers used in the present invention include 2,4-di-tert-butylphenyl 3',5'-di-tert-butyl-4'-hydroxylbenzoate, 2-hydroxy-4-octoxy benzophenone, 2-hydroxy-4-methoxy benzophenone, 2-[2'-hydroxy-3'-(3'',4'',5'',6''-tetra-hydrophthalimidemethyl]-5'-methylphenyl]-benzotriazole, 2-(2'-hydroxy-5'-tert-octylphenyl)benzotriazole, 2-[2'-hydroxy-5'-methylphenyl)benzotriazol, 2-(2'-hydroxy-3'-tert-butyl- 5'-methylphenyl)-5-chlorobenzotriazole, 2-(2'-hydroxy-3',5'-di-tert-amylphenyl)benzotriazole, 2,2'-dihydroxy-4-methoxybenzophenone and 2-(2'-hydroxy-3',5'-tert-butylphenyl)benzotriazole. They may be used alone or as a mixture thereof. The amount of the UV absorber to be added is not more than 5 parts by weight per 100 parts by weight of the terpolymer. If more than 5 parts by weight of the UV absorber is added, the heat resistance and transparency of the resulting terpolymer are deteriorated.

For lubricants and release agents there may be used mineral oils, paraffins, hydrocarbon resins, fatty acid amides, fatty acid ketones, partial esters of fatty acids with polyhydric alcohols, fatty acids, and fatty acid alcohols. They may be used alone or as a mixture thereof in an amount of not more than 5 parts by weight per 100 parts by weight of the terpolymer.

The additives may be dry-blended with the terpolymer using a mixer such as a Henschel mixer which is widely used in the field of synthetic resins, or melt-blended in a mixer such as an extruder, a Banbury mixer or a kneader. If desired, a dry blend of the terpolymer and suitable additives may be subjected to melt blending to obtain a more uniform mixture (composition).

Using the terpolymer or the composition containing the additives, the optical disk substrate of the present invention can be produced by press molding as commonly employed in the molding of thermoplastic resins. However, in view of productivity, the optical disk substrate is preferably produced by injection molding which is common in the field of synthetic resins. It is particularly preferable to adopt those injection molding techniques which are currently used in the manufacture of optical disk substrates.

When the composition comprising the terpolymer and necessary additives is prepared by melt blending or when an optical disk substrate is produced from the composition by press molding or injection molding, the molding temperature is within the range where the terpolymer is melted. However, excessively high temperatures might cause thermal deterioration of the terpolymer. Therefore, the preferred molding temperature is generally within the range of from 220° to 350° C., with the range of from 230° to 340° C. being particularly preferred.

An optical disk substrate may be produced from the composition of the present invention by first melting the composition within the temperature range set forth above until it becomes plastic, then charging the molten composition into a mold containing a stamper provided with pre-grooves or pits in its surface, and cooling the composition to solidify so that the information on the stamper is transferred to the solidified composition. Alternatively, the information in the stamper may be transferred to a sheet or plate in a predetermined form by the 2P process. These techniques are described, for example, in P. Hansen and U. Wille, J. Appl. Phys., 50 7471 (1979) and are commonly employed in the manufacture of optical disks.

On the surface of the so-prepared substrate, a thin film of a recording material such as aluminum or tellurium oxide, an As-Te-Ge base material, an organic dye or an alloyed material of a transition metal (e.g., iron or cobalt) and gadolinium or terbium, as well as a thin layer of a dielectric (e.g., SiO, $SiO_2$ or SiAlON) are formed to fabricate an optical disk. Recording materials and dielectric materials may be selected from among those which are commonly employed, as described, for example, in K. Ohta et al, Proc. Optical Data Storage, SPIE, 382 (1983) and they are not limited to the examples mentioned above.

Cyclohexylmaleimide (component (B)) used as a copolymerizable component in the terpolymer of the present invention is effective in improving its heat resistance. Component (C) is effective not only in imparting flexibility to the terpolymer but also in reducing birefringence that will occur in the substrate produced from said terpolymer. The aromatic vinyl monomer (Component (A)) is a component that is effective not only in reducing the moisture absorption of the terpolymer but also in improving its moldability, and this component, when combined with cyclohexylmaleimide, also serves to reduce birefringence.

The optical disk substrate of the present invention exhibits the birefringence of less than 20 nm, preferably less than 10 nm, the water absorbency of less than 0.3%, preferably less than 0.25%, and the heat resistance of more than 100° C. and preferably more than 125° C., when measured in the manner described below.

The following Examples and Comparative Examples are provided for the purpose of further illustrating the present invention but it should be understood that the scope of the present invention is by no means limited to these examples.

In the Examples and Comparative Examples that follow, "birefringence" was measured with an automatic elipsometer (produced by Mizojiri Kogaku Kogyosho) using a He-Ne laser (633 nm) as a light source. The results are indicated in terms of retardation (optical-path difference) on a double path. "Transparency" was evaluated in terms of light transmittance at 780 nm and 830 nm as measured with a spectrophotometer. "Photo-elastic constant" was calculated from the following formula on the basis of the measurements with a loading apparatus installed on an automatic elipsometer of the same type as used in the measurement of "birefringence":

$$R = dC\sigma$$

wherein R is retardation; d, thickness of the sample; $\sigma$, stress; and C, photoelastic constant.

"Water absorbency" was measured in accordance with ASTM D570, and "heat resistance" was measured in accordance with ASTM D648.

EXAMPLE 1

Sixty parts by weight of styrene, 23 parts by weight of cyclohexylmaleimide and 9 parts by weight of acrylonitrile were uniformly mixed at room temperature (23° C.). To the resulting liquid mixture (hereinafter referred to as liquid mixture I), 0.2 parts by weight of tertiary dodecylmercaptan (as a chain transfer agent), 0.05 parts by weight of lauryl peroxide and 0.035 parts by weight of tertiary butyl peroxyisopropyl carbonate (as polymerization initiators) were added and mixed intimately to form a uniform monomeric liquid mixture (hereinafter referred to as liquid mixture II).

Forty parts by weight of liquid mixture II was charged into an autoclave equipped with a nitrogen supply pipe, a stirrer and a thermometer. The autoclave was further charged with 0.3 parts by weight of potassium phosphate (as a dispersant), 0.00045 parts by weight of sodium dodecylbenzenesulfonate (as a dispersion stabilizer) and 60 parts by weight of water. Reaction was performed under stirring first at 80° C. for 2 hours, then at 120° C. for 2 hours. After elevating the temperature in the system to 135° C., the system was left to cool until the temperature became substantially equal to room temperature. By a subsequent post-treatment consisting of HCl treatment (i.e., reducing the pH to 1 with the addition of HCl), thorough washing with water, filtration and thorough drying, a beaded polymer was obtained. The yield was 98.1% of the theoretical.

EXAMPLE 2

Sixty-two parts by weight of styrene, 24 parts by weight of cyclohexylmaleimide and 14 parts by weight of acrylonitrile were stirred at room temperature to form a uniform liquid mixture. Using this liquid mixture for liquid mixture I, a monomeric liquid mixture was prepared as in Example 1 except that the tertiary butyl peroxyisopropyl carbonate was replaced with 0.05 parts by weight of azoisobutyronitrile.

Using 40 parts by weight of this monomeric liquid mixture, polymerization and a post-treatment were conducted as in Example 1 except that the polymerization was performed with stirring, first at 70° C. for 3 hours, then at 100° C. for 2 hours, and finally at 120° C. for 2 hours. As a result, a beaded polymer was obtained. The yield was 97.2% of the theoretical.

COMPARATIVE EXAMPLES 1 AND 2

In place of liquid mixture I used in Example 1, a liquid mixture consisting of 75 parts by weight of styrene and 26 parts by weight of cyclohexylmaleimide (Comparative Example 1) and a liquid mixture consisting of 60 parts by weight of styrene, 23 parts by weight of N-phenylmaleimide and 9 parts by weight of acrylonitrile (Comparative Example 2) were prepared.

Using these liquid mixtures, monomeric liquid mixtures were prepared as in Example 1, and the resulting liquid mixtures were polymerized and subjected to post-treatments as in Example 1 to make polymers.

A hundred parts by weight of each polymer produced in Examples 1 and 2 and Comparative Examples 1 and 2 was melt-blended with 0.1 part by weight of tetraquis-[methylene-3-(3',5'-di-tert-butyl-4'-hydroxyphenyl)propionate]methane (antioxidant) in a vent-type twin-screw extruder (barrel inside diameter, 30 mm) at a resin temperature of 230° C. and the blend was extruded through a die to form pellets, which were subjected to various tests.

Those pellets having the antioxidant incorporated in the polymers prepared in Examples 1 and 2 and Comparative Examples 1 and 2 were injection-molded at a resin temperature of 320° C. to fabricate optical disk substrates having an outside diameter of 130 mm and a thickness of 1.2 mm. A polycarbonate resin having bisphenol A (molecular weight: about 15,000) bound to phosgene (Comparative Example 3) was injection-molded at a resin temperature of 320° C. to fabricate optical disk substrates of the same size as noted above. In a similar way, a polymethyl methacrylate resin having a molecular weight of about 75,000 (Comparative Example 4) was injection-molded at a resin temperature of 280° C. The thus fabricated substrates were subjected to the measurements of birefringence, transparency, photo-elastic constant, water absorbency and heat resistance. The results are shown in Table 1 below.

TABLE 1

| Example No. | Birefringence (nm) | Transparency 780 nm (%) | Transparency 830 nm (%) | Photoelastic Constant (b)* | Water Absorbency (%) | Heat Resistance (°C.) |
| --- | --- | --- | --- | --- | --- | --- |
| 1 | 6 | 89 | 89 | +2.6 | 0.20 | 125 |
| 2 | 8 | 89 | 89 | +3.2 | 0.23 | 125 |
| Comparative Example 1 | 35 | 88 | 88 | −2.6 | 0.08 | 158 |
| Comparative Example 2 | 21 | 86 | 86 | +14.0 | 0.18 | 135 |
| Comparative Example 3 | 30 | 90 | 90 | +77 | 0.22 | 120 |
| Comparative Example 4 | 5 | 92 | 92 | −2.6 | 0.31 | 90 | b: brewster

EXAMPLE 3

Twenty parts by weight of styrene, 20 parts by weight of cyclohexylmaleimide and 60 parts by weight of isobornyl methacrylate were uniformly mixed at room temperature (23° C.). To the resulting liquid mixture (hereinafter referred to as liquid mixture I'), 0.2 parts by weight of tertiary dodecylmercaptan (as a chain transfer agent), 0.05 parts by weight of lauryl peroxide and 0.035 parts by weight of tertiary butyl peroxyisopropyl carbonate (as polymerization initiators) were added and mixed intimately to form a uniform monomeric liquid mixture (hereinafter referred to as liquid mixture II').

Forty parts by weight of liquid mixture II' was charged into an autoclave equipped with a nitrogen supply pipe, a stirrer and a thermometer. The autoclave was further charged with 0.3 parts by weight of potassium phosphate (as a dispersant), 0.00045 parts by weight of sodium dodecylbenzenesulfonate (as a dispersion stabilizer) and 60 parts by weight of water. Reaction was performed under stirring first at 80° C. for 2 hours, then at 120° C. for 2 hours. After elevating the temperature in the system to 135° C., the system was left to cool until the temperature became substantially equal to room temperature. By a subsequent post-treatment consisting of HCl treatment, thorough washing with water, filtration and thorough drying, a beaded polymer was obtained. The yield was 98.3% of the theoretical.

EXAMPLE 4

Nineteen parts by weight of styrene, 31 parts by weight of cyclohexylmaleimide and 50 parts by weight of isobornyl methacrylate were stirred at room temperature to form a uniform liquid mixture. Using this liquid mixture for liquid mixture I', a monomeric liquid mixture was prepared as in Example 3 except that the tertiary butyl peroxyisopropyl carbonate was replaced with 0.05 parts by weight of azoisobutyronitrile.

Forty parts by weight of this monomeric liquid mixture was subjected to polymerization with stirring, first at 70° C. for 3 hours and then at 100° C. for 2 hours.

After elevating the temperature in the system to 120° C., the system was left to cool to room temperature and subjected to a post-treatment as in Example 3. As a result, a beaded polymer was obtained. The yield was 97.3% of the theoretical.

COMPARATIVE EXAMPLE 5

A beaded polymer was produced by repeating the procedures of Example 3 with respect to polymerization and post-treatment, except that liquid mixture I' was replaced with a liquid mixture composed of 40 parts by weight of styrene and 60 parts by weight of isobornyl methacrylate, and that the amount of lauryl peroxide used in preparing liquid mixture II' was changed to 0.40 parts by weight.

A hundred parts by weight of each polymer produced in Examples 3 and 4 and Comparative Example 5 was melt-blended with 0.1 part by weight of tetraquis[methylene-3-(3',5'-di-tert-butyl-4'-hydroxyphenyl)propionate]methane in a vent-type twin-screw extruder (barrel inside diameter, 30 mm) at a resin temperature of 230° C. and the blend was extruded through a die to form pellets, which were subjected to various tests.

These pellets having the antioxidant incorporated in the polymers prepared in Examples 3 and 4 and Comparative Example 5 were injection-molded at a resin temperature of 320° C. to fabricate optical disk substrates having an outside diameter of 130 mm and a thickness of 1.2 mm. The thus fabricated substrates were subjected to the measurements of birefringence, transparency, photoelastic constant, water absorbancy and heat resistance. The results are shown in Table 2 below.

the temperature become substantially equal to room temperature. The pH of the system was reduced to 1 with HCl. After stirring, the reaction mixture was subjected to thorough washing with water, filtration and thorough drying, and a beaded polymer was obtained. The yield was 98.1% of the theoretical.

EXAMPLE 6

Thirty-five parts by weight of styrene, 53 parts by weight of cyclohexylmaleinimide and 12 parts by weight of cyclohexyl methacrylate were stirred at room temperature to form a uniform liquid mixture. Using this liquid mixture for liquid mixture I" a monomeric liquid mixture was prepared as in Example 5 except that the tertiary butyl peroxisopropyl carbonate was replaced by 0.1 parts by weight of azoisobutyronitrile.

Forty parts by weight of this monomeric liquid mixture was subjected to polymerization at 70° C. for 3 hours, followed by temperature elevation to 100° C. over a period of 90 minutes, and then at 100° C. for 2 hours. After elevating the temperature in the system to 120° C., the system was left to cool to room temperature and subjected to a post-treatment as in Example 5. As a result, a beaded polymer was obtained. The yield was 97.7% of the theoretical.

EXAMPLE 7

In place of liquid mixture I" used in Example 5, a liquid mixture consisting of 25 parts by weight of styrene, 20 parts by weight of α-methylstyrene, 40 parts by weight of cyclohexylmaleimide and 15 parts by weight of cyclohexyl methacrylate was prepared. Using this liquid mixture, a monomeric liquid mixture was pre-

TABLE 2

| Example No. | Birefringence (nm) | Transparency 780 nm (%) | Transparency 830 nm (%) | Photoelastic Constant (b) | Water Absorbency (%) | Heat Resistance (°C.) |
|---|---|---|---|---|---|---|
| 3 | 6 | 88 | 88 | −1.0 | 0.13 | 145 |
| 4 | 8 | 88 | 88 | −1.3 | 0.12 | 135 |
| Comparative Example 5 | 40 | 88 | 88 | −2.6 | 0.08 | 158 |

EXAMPLE 5

Forty-five parts by weight of styrene, 40 parts by weight of cyclohexylmaleinimide and 15 parts by weight of cyclohexyl methacrylate were uniformly mixed at room temperature (23° C.). To the resulting liquid mixture (hereinafter referred to as liquid mixture I'), 0.2 parts by weight of tertiary dodecylmercaptan (as a chain transfer agent), 0.1 parts by weight of lauryl peroxide and 0.35 parts by weight of tertiary butyl peroxyisopropyl carbonate (as polymerization initiators) were added and mixed intimately to form a uniform a monomeric liquid mixture (hereinafter referred to as liquid mixture II").

Forty parts by weight of liquid mixture II" was charged into an autoclave equipped with a nitrogen supply pipe, a stirrer and a thermometer. The autoclave was further charged with 0.3 parts by weight of potassium phosphate (as a dispersant), 0.00045 parts by weight of sodium dodecylbenzenesulfonate (as a dispersion stabilizer) and 60 parts by weight of water. Reaction was performed under stirring at 80° C. for 2 hours, with the temperature being then elevated to 120° C. over a period of 1 hour, and reaction was conducted at 120° C. for 2 hours. After elevating the temperature in the system to 135° C., the system was left to cool until pared as in Example 5 except that the amount of lauryl peroxide was changed to 0.15 parts by weight. The resulting monomeric liquid mixture was subjected to reaction and post-treatment as in Example 5. As a result, a beaded polymer was obtained. The yield was 95.6% of the theoretical.

COMPARATIVE EXAMPLE 6

In place of liquid mixture I" used in Example 5, a liquid mixture consisting of 45 parts by weight of styrene, 40 parts by weight of cyclohexylmaleimide and 15 parts by weight of methyl methacrylate was prepared. Using this liquid mixture, a monomeric liquid mixture was prepared as in Example 5 except that the amount of lauryl peroxide was changed to 0.05 parts by weight. The resulting monomeric liquid mixture was subjected to reaction and post-treatment as in Example 5. As a result, a yellow beaded polymer was obtained. The yield was 98.5% of the theoretical.

COMPARATIVE EXAMPLE 7

In place of liquid mixture I" used in Example 5, a liquid mixture consisting of 45 parts by weight of styrene, 40 parts by weight of N-phenylmaleimide and 15 parts by weight of cyclohexylmethacrylate was prepared.

Using this liquid mixture, a monomeric liquid mixtures was prepared as in Example 5. The resulting liquid mixture was polymerized and subjected to post-treatments as in Example 5 to make a polymer. The yield of the polymer was 98.3% of the theoretical.

A hundred parts by weight of each of the polymers produced in Examples 5 to 7 and Comparative Examples 6 and 7 was melt-blended with 0.1 parts by weight of tetraquis-[methylene-3-(3',5'-di-tert-butyl-4'-hydroxyphenyl)propionate]methane in a vent-type twin-screw extruder (barrel inside diameter, 30 mm) at a resin temperature of 230° C. and the blend was extruded through a die to form pellets, which were subjected to various tests.

Those pellets having the antioxidant incorporated in the polymers prepared in Examples 5 to 7 and Comparative Examples 6 and 7 were injection-molded at a resin temperature of 320° C. to fabricate optical disk substrates having an outside diameter of 130 mm and a thickness of 1.2 mm. The thus fabricated substrates were subjected to the measurements of birefringence, transparency, photoelastic constant, water absorbancy and heat resistance. The results are shown in Table 3 below.

TABLE 3

| Example No. | Birefringence (nm) | Transparency 780 nm (%) | Transparency 830 nm (%) | Photoelastic Constant (b) | Water Absorbency (%) | Heat Resistance (°C.) |
|---|---|---|---|---|---|---|
| 5 | 7 | 90 | 90 | +2.5 | 0.18 | 120 |
| 6 | 8 | 91 | 90 | +2.8 | 0.21 | 141 |
| 7 | 6 | 90 | 91 | +2.0 | 0.18 | 132 |
| Comparative Example 6 | 5 | 91 | 91 | −0.8 | 0.27 | 126 |
| Comparative Example 7 | 33 | 89 | 89 | +10.2 | 0.18 | 123 |

The results of Examples 1 to 7 and Comparative Examples 1 to 7 show the following: the terpolymer prepared in accordance with the present invention experiences low birefringence, high transparency and a small photoelastic constant; because of these features, an optical disk substrate produced from this terpolymer will not experience any appreciable amount of birefringence when it is rotated for use; the terpolymer also will not undergo any marked deformation upon moisture absorption; in addition, the terpolymer is more heat-resistant than those polycarbonate and polymethyl methacrylate resins which are used in the manufacture of commercial optical disk substrates, so that not only thermal deformation but also damage to pre-grooves that would otherwise occur during information writing with a laser beam can be prevented.

As described above, the terpolymer used in fabricating the optical disk substrate of the present invention is not only high in transparency and heat resistance but also low in moisture absorption and birefringence. In addition, this terpolymer can be injection-molded as in the case of conventional optical disk substrate materials and hence provides for efficient production of optical disks including compact disks and video disks.

While the invention has been described in detail and with reference to specific embodiments thereof, it will be apparent to one skilled in the art that various changes and modifications can be made therein without departing from the spirit and scope thereof.

What is claimed is:

1. An optical disk substrate molded from a terpolymer composed of (A) an aromatic vinyl monomer represented by formula (I)

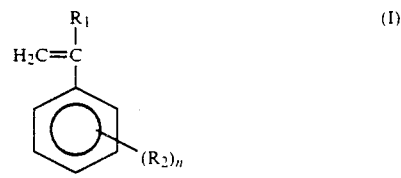

wherein $R_1$ represents a hydrogen atom or a hydrocarbon group having one or two carbon atoms, $R_2$ represents a straight-chain, branched-chain or cyclic hydrocarbon group having not more than 8 carbon atoms, and n is 0 or an integer of 1 to 5, (B) cyclohexylmaleimide, and (C) at least one compound selected from the group consisting of (meth)acrylontrile, isobornyl (meth)acrylate and cyclohexyl (meth)acrylate, with the cyclohexylmaleimide (B) being present in an amount of from 5 to 60 wt% of said terpolymer and with the at least one compound (C) being present in an amount of from 5 to 80 wt% of said terpolymer.

2. An optical disk substrate as in claim 1, wherein said component (C) is (meth)acrylonitrile, and the cyclohexylmaleimide and the (meth)acrylonitrile are present in amounts of from 5 to 40 wt% and from 5 to 25 wt%, respectively, with the balance being the aromatic vinyl polymer.

3. An optical disk substrate as in claim 2, wherein said component (C) is acrylonitrile.

4. An optical disk substrate as in claim 1, wherein said component (C) is isobornyl (meth)acrylate, and the cyclohexylmaleimide and the isobornyl (meth)acrylate are present in amounts of from 5 to 60 wt% and from 10 to 80 wt%, respectively, with the balance being the aromatic vinyl monomer.

5. An optical disk substrate as in claim 4, wherein said component (C) is isobornyl methacrylate.

6. An optical disk substrate as in claim 1, wherein said component (C) is cyclohexyl (meth)acrylate, and the cyclohexylmaleimide and the cyclohexyl (meth)acrylate are present in amounts of from 10 to 60 wt% and from 5 to 45 wt%, respectively, with the balance being the aromatic vinyl monomer.

7. An optical disc substrate as in claim 6, wherein said component (C) is cyclohexyl methacrylate.

8. An optical disk substrate as in claim 1, wherein the amount of said compound (C) is from 5 to 25 wt% when said compound (C) is (meth)acrylonitrile; the amount of said compound (C) is from 10 to 80 wt% when said compound (C) is isobornyl (meth)acrylate and the amount of said compound (C) is from 5 to 45 wt% when said compound (C) is cyclohexyl (meth)acrylate.

9. An optical disk substrate as in claim 1, wherein said aromatic vinyl monomer (A), is selected from the group consisting of styrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, 2,5-diethylstyrene, 3,5-diethylstyrene, 2,4,5-triethylstyrene, 2,3,4,5-tetraethylstyrene, pentaethylstyrene, o-isopropylstyrene, m-isopropylstyrene, p-isopropylstyrene, p-n-butylstyrene, m-sec-butylstyrene, p-sec-butylstyrene, m-tert-butylstyrene, p-tert-butylstyrene, p-hexylstyrene, p-heptylstyrene, p-octylstyrene, p-nonylstyrene, p-decylstyrene, p-dodecylstyrene, p-tetradecylstyrene, p-hexadecylstyrene, p-octadecylstyrene, p-sec-amylstyrene, p-sec-hexylstyrene, p-sec-heptylstyrene, p-sec-octylstyrene, p-sec-nonylstyrene, p-sec-decylstyrene, 2,4,5-triisopropylstyrene, 2,6-dimethyl-4-tert-butylstyrene, and p-cyclohexylstyrene.

10. An optical disk substrate as in claim 1, wherein said aromatic vinyl monomer is styrene or $\alpha$-methylstyrene.

* * * * *